(No Model.)
J. BOLICK.
VEHICLE WHEEL.
No. 417,977. Patented Dec. 24, 1889.
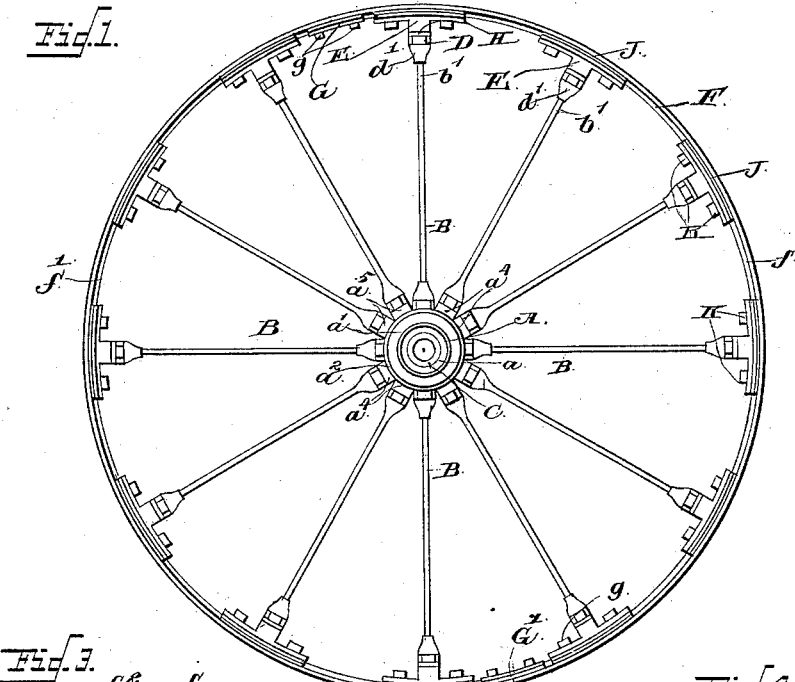
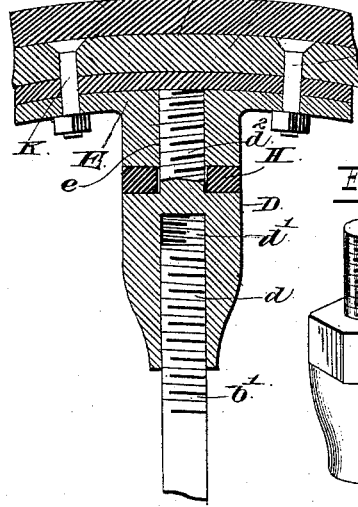
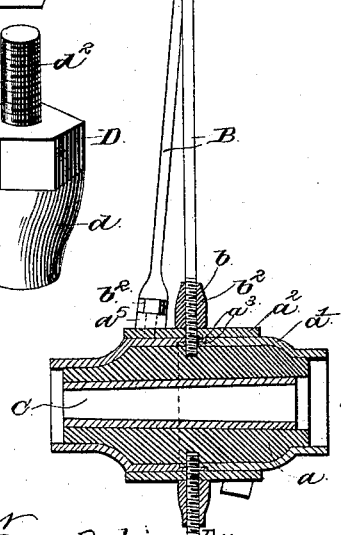
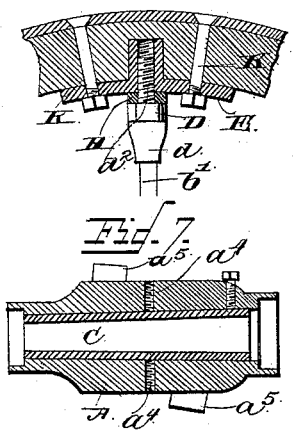
Witnesses.
Inventor
Jerome Bolick
By his Attorneys, ID="page-content"

UNITED STATES PATENT OFFICE.

JEROME BOLICK, OF CONOVER, NORTH CAROLINA.

VEHICLE-WHEEL.

SPECIFICATION forming part of Letters Patent No. 417,977, dated December 24, 1889.

Application filed September 24, 1889. Serial No. 324,871. (No model.)

*To all whom it may concern:*

Be it known that I, JEROME BOLICK, a citizen of the United States, residing at Conover, in the county of Catawba and State of North Carolina, have invented a new and useful Wheel, of which the following is a specification.

The invention relates to improvements in wheels.

The object of the present invention is to improve, simplify, and cheapen the construction of wheels and increase their strength and durability.

The invention consists in the construction and novel combination and arrangement of parts hereinafter fully described, illustrated in the accompanying drawings, and pointed out in the claims hereto appended.

In the drawings, Figure 1 is a side elevation of a wheel constructed in accordance with the invention. Fig. 2 is a transverse sectional view. Fig. 3 is a detail sectional view showing the manner of securing a spoke to the tire. Fig. 4 is a similar view illustrating the manner of securing the ends of the tire together. Fig. 5 is a sectional view illustrating a modification of the invention, and showing the manner of securing a spoke to the ordinary wooden felly. Fig. 6 is a detail perspective view of the nut for tightening the spoke. Fig. 7 is a sectional view illustrating a modification of the hub.

Referring to the accompanying drawings by letter, A designates a hub, which consists of the wooden body $a$, the metallic sections $a'$, and the central band $a^2$. The sections $a'$ have their inner edges rabbeted and overlapping and provided with registering perforations $a^3$, through which pass spokes B, whereby the metallic sections $a'$ are secured together on the wooden body $a$. The central bands $a^2$ are provided with sockets $a^4$, which are arranged in three rows, the outer rows being slightly inclined toward each other to permit spokes to be staggered at each side of a central vertical row. The sockets $a^4$ are internally threaded, and the lower ends $b$ of the spokes are threaded and engage said sockets $a^4$, and the central spoke extends through the socket, the band $a^2$, and the registering perforations of the metallic sections $a'$ and projects a suitable distance into the body $a$ of the hub. The hub is provided with an axle-box C, which is secured in the wooden body $a$ in the ordinary manner. The upper ends $b'$ of the spokes B are threaded and engage internally-threaded openings $d$ of sockets $d'$, formed integral with nuts D. The nut D has a socket $d'$ on its lower side and provided on its upper face with a threaded stem $d^2$, which engages a threaded opening $e$ in a felly-plate E. The nut D has its threaded stem provided with right-hand threads and its opening provided with left-hand threads, or vice versa, whereby the spokes may be tightened or loosened, as desired, by turning the nut.

The felly-plate E is bolted to a tire F, which is constructed in two sections $f f'$, that are secured together by plates G G', that are arranged upon each side of the section and fastened thereto by bolts and nuts $g$, the plates conforming to the configuration of the tire. The tire F is provided on its exterior face with an annular groove $f^2$, which is semicircular in cross-section and adapted for the reception of an auxiliary tire I, which is constructed of rubber or other similar elastic material. The groove $f^2$ of the tire F is formed by curving the middle portion $f^3$ of the tire, and the felly-plate is provided with a groove or concavity $e'$, whereby the said felly-plate is made to conform to the configuration of the inner face of the tire and the parts enabled to fit closely and securely together without liability of being accidentally displaced by moving laterally upon each other. A rubber plate J is interposed between the tire and the felly-plate, and a rubber washer H is placed between the nut and the lower end of the felly-plate, whereby the wheel is adapted to pass over rough surfaces without experiencing damage from the shocks. The felly-plate is secured to the tire by bolts K, which pass through perforations in the tire and plate and have their heads countersunk in the former.

The lower ends $b$ are provided with hexagon collars $b^2$, which may either be formed or pressed integral with the spokes or be constructed separate and suitably secured in place. These collars $b^2$ form a broad bearing for the spokes, and the sockets $a^4$, which receive the staggered spokes, are preferably formed in projections $a^5$, while the sockets for the central vertical spokes may be simply openings or perforations, which, together with the perforations of the metallic sections $a'$, are preferably threaded to engage the lower threaded end $b$ of the spoke.

In Fig. 5 I have illustrated a modification of the invention, in which the spokes B are secured to an ordinary wooden felly. The felly is provided with a felly-plate that is secured in place by bolts, and is provided with a threaded opening to receive the threaded stem $d^2$ of the nut D.

In Fig. 7 is illustrated a modification of the hub, which modification consists of a solid metal body in which the axle-box is secured in place by set-screws. The hub is provided with a series of centrally-arranged threaded openings to receive the vertical spokes, and is provided with integral inclined projections to receive the inclined or staggered spokes.

I desire it to be understood that I do not limit myself to the precise detail of construction herein shown and described, as I may, without departing from the spirit of the invention, make various minor changes therein.

From the foregoing description and the accompanying drawings the construction, operation, and advantages of the invention will be readily understood.

Having thus described my invention, what I claim, and desire to secure by Letters Patent, is—

1. In a wheel, the combination of the body $a$ of the hub, the overlapping metallic sections $a'$, provided with registering perforations, the central band $a^2$, having openings registering with the perforations of the metallic sections, and the spokes B, passing through the perforations and openings and securing the parts together, substantially as described.

2. The combination of the body $a$ of the hub, the metallic sections $a'$, overlapping and provided with registering perforations, the central band having openings registering with said perforations and provided with inclined projections $a^5$, and the spokes, substantially as described.

3. The combination of the spokes, the tire, the felly-plates secured to the tire and provided with threaded openings, and the nuts D, having threaded stems to engage the openings in the felly-plates and the sockets to receive the ends of the spokes, substantially as described.

4. The combination of the spoke, the tire, the felly-plates suitably secured to the tire and having a threaded opening, the nut D, provided with a threaded stem to engage the opening in the felly-plate and having a socket to receive the end of the spoke, and the rubber interposed between the tire and the felly-plate and the felly-plate and the nut, substantially as described.

5. In a wheel, the combination of the tire provided with a groove semicircular in cross-section and the auxiliary tire constructed of rubber or similar material and fitting in said groove, and being semicircular in cross-section and lying flush with the top of the tire on each side of the groove, substantially as described.

6. The combination of the tire having its central portion $f^3$ curved and forming a groove $f^2$, the felly-plate provided with a groove and conforming to the configuration of the inner face of the tire, the spoke, and the nut having a socket to receive the spoke and provided with a stem to engage the felly-plate, substantially as described.

7. The combination of the hub provided with a series of central openings and having inclined projections provided with sockets, the vertical spokes fitting in said openings and the inclined spokes inserted in said sockets, the tire, and the felly-plates bolted to the tire and provided with sockets to receive the spokes and adapted to engage the felly-plates, substantially as described.

In testimony that I claim the foregoing as my own I have hereto affixed my signature in presence of two witnesses.

JEROME BOLICK.

Witnesses:
  GEO. E. COULTER,
  P. C. SHUFORD.